United States Patent
Chen et al.

(10) Patent No.: US 9,774,162 B2
(45) Date of Patent: Sep. 26, 2017

(54) POTASSIUM FLUOROBORATOBERYLLATE CRYSTAL OBLIQUE-INCIDENCE LASER SECOND HARMONIC GENERATOR

(71) Applicant: TECHNICAL INSTITUTE OF PHYSICS AND CHEMISTRY, CHINESE ACADEMY OF SCIENCES, Beijing (CN)

(72) Inventors: Chuangtian Chen, Beijing (CN); Bo Xu, Beijing (CN); Xiaoyang Wang, Beijing (CN); Feidi Fan, Beijing (CN); Lijuan Liu, Beijing (CN); Rukang Li, Beijing (CN)

(73) Assignee: TECHNICAL INSTITUTE OF PHYSICS AND CHEMISTRY, CHINESE ACADEMY OF SCIENCES, Beijing (CN)

( * ) Notice: Subject to any disclaimer, the term of this patent is extended or adjusted under 35 U.S.C. 154(b) by 0 days.

(21) Appl. No.: 15/325,088

(22) PCT Filed: Sep. 30, 2014

(86) PCT No.: PCT/CN2014/087875
§ 371 (c)(1),
(2) Date: Jan. 10, 2017

(87) PCT Pub. No.: WO2016/015380
PCT Pub. Date: Feb. 4, 2016

(65) Prior Publication Data
US 2017/0170623 A1   Jun. 15, 2017

(30) Foreign Application Priority Data
Jul. 29, 2014 (CN) .......................... 2014 1 0367510

(51) Int. Cl.
*H01S 3/109* (2006.01)
*H01S 3/06* (2006.01)

(52) U.S. Cl.
CPC ............ *H01S 3/109* (2013.01); *H01S 3/0604* (2013.01); *H01S 3/0623* (2013.01)

(58) Field of Classification Search
CPC ............................... H01S 3/109; H01S 3/0623
See application file for complete search history.

(56) References Cited

U.S. PATENT DOCUMENTS 6,859,305 B2   2/2005   Chen et al.
8,773,750 B2   7/2014   Chen et al.
(Continued)

FOREIGN PATENT DOCUMENTS

CN   1381930 A   11/2002
CN   102088160   6/2011
(Continued)

*Primary Examiner* — Dung Nguyen
(74) *Attorney, Agent, or Firm* — Gokalp Bayramoglu

(57) ABSTRACT

A potassium fluoroboratoberyllate crystal oblique-incidence laser frequency multiplier, comprising: a flake-like potassium fluoroboratoberyllate crystal having parallel front and back polished surfaces; a front antireflection film and a back antireflection film; a columnar crystal support provided with a square holding slot and a light through-hole; and external heating jackets; the crystal is disposed in the square holding slot, the front and back surfaces of the crystal conforming to a main surface of the square holding slot, a normal of the main surface of the holding slot forming an angle θ with the central axis of the crystal support; a laser at a fundamental frequency passes through the front antireflection film, and a frequency-multiplied laser generated in the crystal is transmitted out through the back antireflection film. The present invention has a simple structure and a low cost, and is suitable for medium- and high-power laser systems.

10 Claims, 2 Drawing Sheets

(56) References Cited

U.S. PATENT DOCUMENTS

| | | | |
|---|---|---|---|
| 2002/0154384 A1* | 10/2002 | Chen | G02F 1/3501 359/326 |
| 2012/0236894 A1 | 9/2012 | Onose et al. | |
| 2013/0202003 A1* | 8/2013 | Kakizaki | H01S 3/10007 372/21 |
| 2014/0111799 A1* | 4/2014 | Lei | G01N 21/9501 356/237.5 |

FOREIGN PATENT DOCUMENTS

| | | |
|---|---|---|
| CN | 102768450 A | 11/2012 |
| JP | 4074124 | 4/2008 |

\* cited by examiner

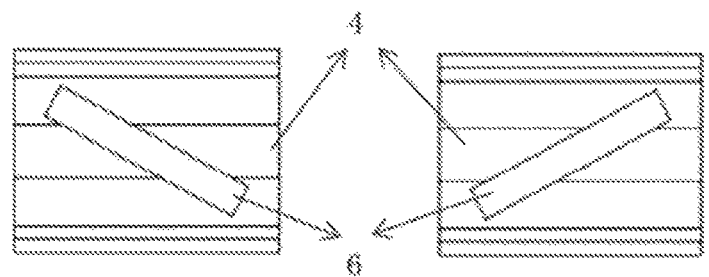
Fig. 4
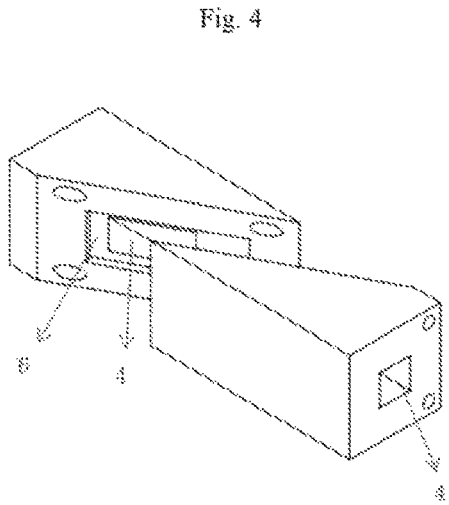
Fig. 5
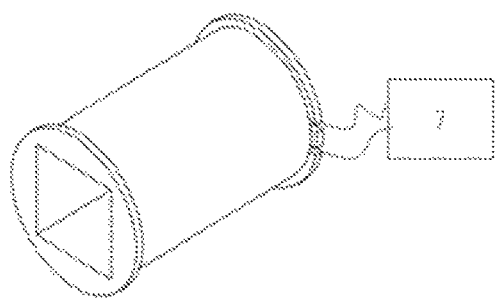 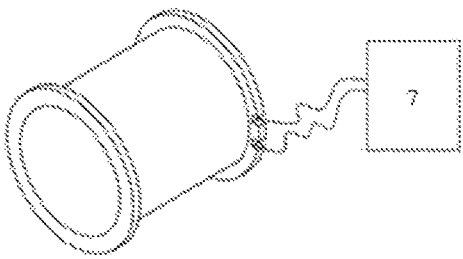
Fig. 6a  Fig. 6b

POTASSIUM FLUOROBORATOBERYLLATE CRYSTAL OBLIQUE-INCIDENCE LASER SECOND HARMONIC GENERATOR

CROSS REFERENCE TO RELATED APPLICATIONS

This application is the national phase entry of International Application No. PCT/CN2014/087875, filed on Sep. 30, 2014, which is based upon and claims priority to Chinese Application No. 201410367510.2, filed on Jul. 29, 2014, the entire contents of which are incorporated herein by reference.

TECHNICAL FIELD

The invention relates to a laser second harmonic generator and particularly relating to a potassium fluoroboratoberyllate (written as KBBF) crystal oblique-incidence laser second harmonic generator.

BACKGROUND OF THE INVENTION

The technology of frequency convention used for generating a new waveband laser (including second harmonic generation, sum frequency generation, difference frequency etc.) by nonlinear optical crystals is widely used. Thereof one of the key technologies is the nonlinear optical crystal and the design of the nonlinear optical crystals laser second harmonic generator. During the frequency convention it is necessary for the nonlinear optical crystals to satisfy the condition of the conservation of momentum, namely the phase matching condition. The ways of the phase matching mainly comprise angular phase matching, temperature phase matching and quasi phase matching. For example, in the conventional process of second harmonic generation, the angular phasing matching is that the laser with specific polarization direction propagates along one particular direction (phase matching direction) of the nonlinear optical crystal, namely generating second harmonic generation laser. The temperature phase matching is the process that the crystal's refractive indexes is changed via changing the temperature of the nonlinear optical crystal in order to satisfy with the phase matching condition. However, the range of variation for the crystal's refractive index ellipsoid is limited, thus the temperature phase matching can be seen as a finite correction for the angular phase matching. The quasi phase matching is realized in dielectric super-lattices by the modulation of reciprocal lattice to compensate the phase mismatch caused by refractive index dispersion. This method is not practical and rarely used in application. Commonly, the crystal in second harmonic generator should be cut along the phase matching direction and then be manufactured into the required shape. The two optical surfaces need to be performed precision polishing and plated into the different required optical films. The laser is normally or nearly normally incident on the surface of the nonlinear optical crystal for the second harmonic generation.

The nonlinear optical crystals show a layered growth habit. Their modality is the plate-like crystal and they are easy to cleavage along one surface thereon because of their intrinsic structure properties. It is difficult to manufacture these crystals along its phase matching directions. For example, borofluoride beryllium crystal potassium family (the present application comprises two kinds of crystals, namely Potassium Beryllium Fluoroborate $KBe_2BO_3F_2$, written as KBBF; Rubidium Beryllium Fluoroborate $RbBe_2BO_3F_2$, written as RBBF). It is easy to cleavage along crystallographic c-surface because of the layered growth habit of the two kinds of crystals, and it is difficult to grow thick along the axis of c direction (namely the optical axis direction). The crystals exhibit flaky form and the two exposed nature face are the crystallographic c-plane, also known as the (001) plane, or the a-b plane. It is difficult to cut along the phase matching direction for second harmonic generation used by KBBF crystal family. To solve the above-mentioned problems, there is provided with a coupler and optical contact prism coupling technology (PCT) with prism-nonlinear optical crystals (ZL 01115313. X; U.S. Pat. No. 6,859,305B2; Japanese Patent 4074124), which successfully solved the problems of the phase matching for KBBF crystal family. This invention, which combined the KBBF crystal being difficult to be cut and the prisms with specific shape, realized the second harmonic generation laser for deep ultraviolet laser (namely wavelength is under 200 nm). This technology also belongs to the angle phase matching.

In the prism coupled device, the KBBF crystal family coupled, with the prisms (typically quartz glass or calcium fluoride crystals) by ordinary optical contact bonding. Since the device is optical coupled between two different materials, the binding force is weak, and the thermal expansion coefficient is different, the inconsistent expandation will be produced when the device is heated, which will cause the separation of the two optical elements and even damaged of the two optical elements interfaces. Especially when KBBF family prism coupled device operating at the medium power laser system and the high power laser system, the laser power is high and the time of the pulse duration is long, which will cause the temperature of the optical interface increase by strong absorption. This usually causes the interface damaged firstly, which will have influence on the laser beam quality and even leading to the separation of the two interfaces, then the whole device is scrapped. Although the diffusion bonded technology is developed (U.S. Pat. No. 8,773,750), which improved the laser damage threshold than the ordinary optical coupled technology. Compared with the photo damage resistance threshold of the KBBF crystal, the value is still too low. For example, for the wavelength of 1064 nm, pulse width of 80 ps and the repetition rate of 1 KHz, the photo damage resistance threshold of KBBF crystal reaching to 900 $GW/cm^2$. For the fundamental frequency optical wavelength of 390 nm, pulse width of 200 fs and repetition rate of 1 KHz, the damage threshold also reaching up to 60 $GW/cm^2$. Under the same condition, the laser damage threshold of the KBBF crystals is nearly one order magnitude larger than that of the BBO crystals. In the currently known nonlinear optical crystals, the KBBF crystals have the highest laser damage threshold. But the laser damage threshold of the KBBF prism coupler is just 300 $MW/cm^2$ under the wavelength of 1064 nm, pulse width of 0.9 ns and repetition rate reaching to 6 KHz.

In addition, another drawback of the prism coupled device is the volume is too much as it coupled with the quartz glass or calcium fluoride crystal prism. As the thermal conductivity for quartz and calcium fluoride is poor, so it is difficult to control the temperature of KBBF in the practical process and maintain the stability of the output power of the laser second harmonic generation.

Currently, the fourth harmonic generation of 266 nm laser output of 1064 nm realized by KBBF crystal is achieved through prism coupling technology. The biggest obstacle for implementing the prism coupling technology is the damage usually happened at the optical interface. Prism coupling technology for deep ultraviolet laser output by KBBF family crystal is only the one technological route. But the prism coupling technology is not the unique way when the fourth harmonic generation laser of 266 nm being output.

SUMMARY OF THE INVENTION

The purpose of the invention is to provide a laser second harmonic generator with nonlinear optical crystals and the laser second harmonic generator does not need to cut the nonlinear optical crystals in accordance with the phasing matching angular. This application enable the nonlinear optical crystals being difficult to be cut to realize the phasing matching and laser second harmonic generation without being cut.

The principle of the laser second harmonic generator with nonlinear optical crystals: the plate-like nonlinear optical crystal was mounted in the square groove of the columnar crystal holder. According to the Snell's Law, refractions occurs when the light travels from one medium to another and the angles of the incident and refraction should satisfy the law of refraction. According to the principle, it is assumed that the phase matching angle is θPM for the second harmonic generation of a certain laser wavelength, we simply need that the angle between the normal direction of the groove surface and the central axis of the crystal holder is θ, and the angle satisfy $\sin\theta/\sin\theta_{PM}=n$, n is the refractive index of the crystal. Due to the plate-like nonlinear optical crystal was inserted into the groove and the normal direction of the front and back surface for the plate-like crystal mounted in the groove is consistent with that of the square groove, after the laser passes through the aperture and then is shot into the crystals along the axis direction of the crystal holder, the laser automatically travels along the direction of the phase matching and realize second harmonic generation. The second harmonic generation laser is shot out from another surface of the crystal and the second harmonic generation laser will also continue traveling along the axis of the crystal holder in accordance with the refraction law. Certainly, the maximum value of θ is only 90°, thus the θPM is limited from 0° to a specific angle. And therefore it can realize the second harmonic generation for a certain range of wavelength. According to calculations, the laser second harmonic generator can realize the shortest the second harmonic generation laser output for KBBF crystal and the shortest wavelength is 238 nm (476 nm→238 nm). The laser second harmonic generator can realize the shortest the second harmonic generation laser output for RBBF crystal and the shortest wavelength is 254 nm (508 nm→254 nm). According to the type of nonlinear optical crystal and the different wavelengths for second harmonic generation, the angle θ has different values. For example, for the process from 532 nm to 266 nm, the angle of θ for KBBF crystal being implemented is 62.16°, while the angle is 73.02° for RBBF crystal being implemented.

The technical solution of the present invention is as follows:

The present invention provides a potassium KBBF crystal oblique-incidence laser second harmonic generator, which comprises a plate-like KBBF family crystal with the former polished surface and the later polished surface being mutual parallel; a former antireflection film and a later antireflection film being respectively plated on the former polished surface and the later polished surface of the plate-like KBBF family crystal; a columnar crystal holder and a heating tube being arranged on the outer surface of a columnar crystal holder. Wherein an aperture is mounted on the columnar crystal holder along the central axis of the columnar crystal holder, and a square groove is mounted in the columnar crystal holder, and the square groove is connected to the aperture, the angle between the normal direction of the square groove surface and the central axis of the columnar crystal holder is θ.

The plate-like KBBF family crystal was mounted in the square groove of the columnar crystal holder, the normal direction of the front and back surface for the KBBF family crystal is consistent with the normal direction of the square groove.

The fundamental laser travels along the central axis of the columnar crystal holder and then incidents on the former antireflection film of the front surface of the KBBF crystal. The fundamental laser achieves the phase matching condition at the inside of the KBBF family crystal, and the second harmonic laser is emitted out from the later antireflection films of the rear surface of the KBBF family crystal and travels along the central axis direction of the crystal holder.

The KBBF family crystal is the Borofluoride Beryllium Potassium (KBBF) crystal or the Borofluoride Beryllium Rubidium (RBBF) crystal. The angle θ for KBBF crystal is 62.16°. The angle θ for RBBF crystal is 73.02°.

The former antireflection film has high transmission for 532 nm laser. The back antireflection film has high transmission for 532 nm and 266 nm lasers.

The polished front surfaces and the polished rear surfaces of the KBBF family crystal are both the crystallography c-plane of the KBBF family crystal. The surface roughness Ra is less than 0.5 nm, the surface accuracy is less than ⅛ aperture.

The shape of the columnar crystal holder can be cylinder, square cylinder or polygonal prismcylinder.

The columnar crystal holder make the square groove be equally divided into upper and lower parts along the horizontal direction. Or the columnar crystal holder make the square groove be equally divided into left and right parts along the vertical direction.

The material of the columnar crystal holder is red copper or aluminum.

The heating tube was winded by the resistance wire which is connected with the temperature control device to control the crystal temperature precisely.

There is provided with the KBBF family crystal obliquely incidenting on the second harmonic generator, which have the following advantages:

1. the KBBF family crystal is not required to be cut along the phase matching condition direction, and only the two nature crystallographic c-plane are required to be polished. The purpose for this is to reduce the Fresnel reflection happened on the two surfaces of the crystal by the laser, and the polished front surfaces and the polished rear surfaces of the KBBF family crystal can be coated with the former antireflection film and the back antireflection film.

2. the second harmonic generation conditions can be realized without the prism-coupled technology because of the simple process. And since there is not provided with the connected surface between the KBBF crystal and the prisms, the photo damage resistance threshold of the KBBF crystal can be greatly improved.

3. The KBBF crystal mounted in the crystal holder through the square groove, the heating tube may be easily to control the temperature in order to maintain the temperature stability of the crystal and then to stabilize the harmonic laser output.

4. It is particularly suitable for producing the 266 nm Nd ion laser output of the fourth harmonic generation. At present, there is lack of nonlinear optical crystals for 266 nm laser output at middle and higher power. KBBF crystal has large the photo damage resistance threshold, the wide temperature bandwidth, the large thermal conductivity and no deliquescence etc, the KBBF crystal can be used for generating the 266 nm Nd ion laser output of the fourth harmonic generation of the medium and high power 266 nm laser output by adopting the technical solution of the present invention.

BRIEF DESCRIPTION OF THE DRAWING

FIG. 4 is the diagram of the semi-cylinders.

FIG. 5 is the diagram of the square cylinder crystal holder comprised of the two similar triangular prisms.

FIG. 6a and FIG. 6b are respectively the schematic diagrams of the heating tube.

DETAILED DESCRIPTION OF THE INVENTION

Embodiment 1

An Embodiment of the Second Harmonic Generator for Laser for the Present Invention: an External-Cavity with the Fourth Harmonic Generation by KBBF Crystal Firstly, the front and back surface of the plate-like KBBF crystal 1 with 3 mm thickness are polished along its c-axis direction, and then the roughness Ra of the front and back surface is less than 0.5 nm, and the surface accuracy is less than ⅛ aperture.

Furthermore, the front surface of KBBF crystal 1 was coated with the former antireflection film 2 and the back surface of KBBF crystal 1 was coated with the later antireflection film 21. The antireflection films can reduce the reflection light losses for the incident and emitted lasers with the same incident angle of 62.16°. The former antireflection film coated on the front surface of KBBF crystal has high transmittance for 532 nm laser, and the transmittance is greater than 99.9%. The later antireflection film coated on the back film of KBBF crystal has high transmittance for 532 nm and 266 nm lasers, and the transmittance is greater than 99.9%.

Figure 1:
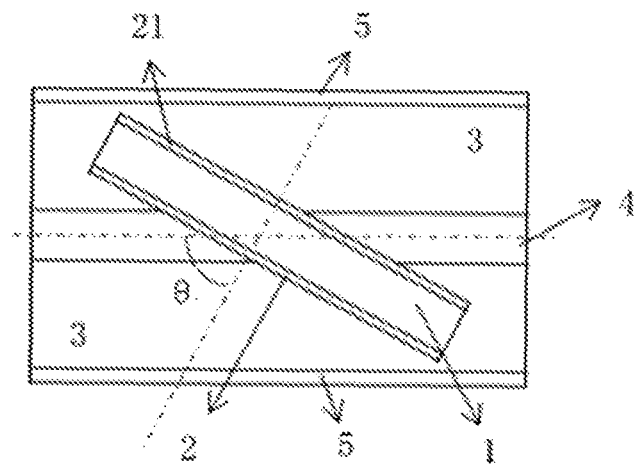
FIG. 1 is the schematic diagram of the second harmonic generator for laser for the present invention.
Figures 2A, 2B:
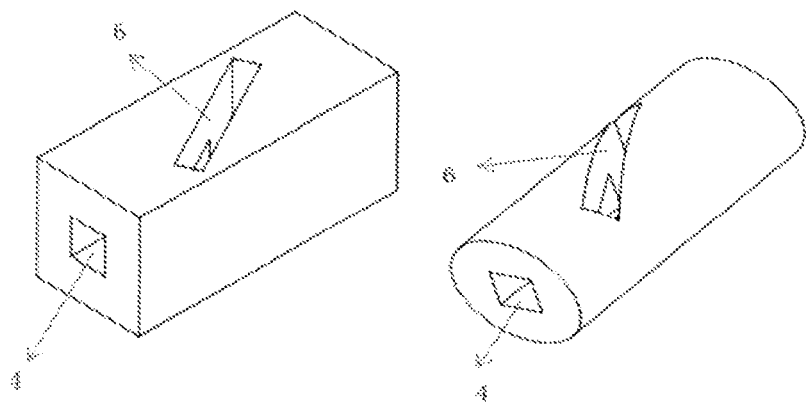
FIG. 2a is the schematic diagram of the square cylinder crystal holder for the overall structure and FIG. 2b is the schematic diagram of the cylinder crystal holder for the overall structure.

As shown in FIG. 2a, a through aperture 4 is arranged on the square cylinder crystal holder 3 of the overall structure along the central axis direction. A square groove 6 is vertically downward from the top of the square cylinder crystal holder 3 arranged in the square cylinder crystal holder 3, which connected with the through aperture 4, the angle θ between the normal direction of the square groove and the central axis of the crystal holder is 62.16°. The material of the crystal holder is red cooper. The KBBF crystal coated with antireflection films on the front and back surface was mounted in the square groove of the square cylinder crystal holder. The normal direction of the front surface of the plate-like KBBF crystal and the normal direction of the back surface of the plate-like KBBF crystal are consistent with the normal direction of the square groove, then the heating tube 5 is arranged on the outer surface of the crystal holder 3 (FIG. 6a). The temperature of KBBF crystal was maintained at 120° C.

The linear polarized 532 nm laser with average power of 63 W, repetition rate of 10 KHz and pulse width of 10 ns was focused by a focusing len with a focal length of 300 mm. The laser travels along the central axis of the crystal holder 3 through the aperture 4 and incident on the former antireflection film 2 coating on the front surface of KBBF crystal. After the refraction generated on the front surface of the KBBF crystal, the laser can realize the phase matching condition at the inside of the KBBF crystal and generate 266 nm laser emitted from the later antireflection film 21 coating on the back surface of the crystal holder along the central axis direction of the crystal holder 3, and then obtain stabile 266 nm laser output of 11.9 W, and the conversion efficiency is 18.9%.

Embodiment 2

Another Embodiment of the Second Harmonic Generator for Laser for the Present Invention: an External-Cavity with the Fourth Harmonic Generation by KBBF Crystal Firstly, the front and back surface of the plate-like KBBF crystal 1 with 3 mm thickness are polished along its c-axis direction, and then the roughness Ra of the front and back surface is less than 0.5 nm, and the surface accuracy is less than ⅛ aperture.

Furthermore, the front surface of KBBF crystal 1 was coated with the former antireflection film 2 and the back surface of KBBF crystal 1 was coated with the later antireflection film 21. The antireflection films can reduce the reflection light losses for the incident and emitted lasers with the same incident angle of 62.16°. The former antireflection film coated on the front surface of KBBF crystal has high transmittance for 532 nm laser, and the transmittance is greater than 99.9%. The later antireflection film coated on the back film of KBBF crystal has high transmittance for 532 nm and 266 nm lasers, and the transmittance is greater than 99.9%.

Figure 3:
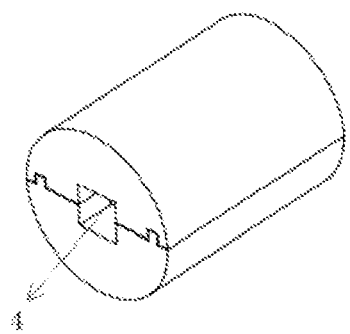
FIG. 3 is a crystal holder schematic diagram comprised of the two semi-cylinders.

As shown in FIG. 3, the columnar crystal holder 3 comprises two identical semi-cylinder axis cross sections which is butt to butt each other. As shown in FIG. 4, one through groove is arranged into the one semi-cylinder axis cross section along the axis direction, another through groove is arranged into the other semi-cylinder axis cross section along the axis direction. The two through grooves are comprised of the aperture 4 which is arranged on the columnar crystal holder 3 along the central axis direction. Every semi-cylinder opened a square groove. The square groove is perpendicular to the semi-cylinder axis cross section and is connected with the aperture, the angle θ between the normal direction of the square groove and the central axis of the crystal holder is 62.16°. Two bulges and two corresponding grooves were provided respectively in the two semi-cylinders. Inserting the two bulges into the two corresponding grooves will form the columnar crystal holder 3.

The material of the columnar crystal holder 3 is aluminum.

The plate-like KBBF crystal coated with antireflection films was mounted in the square groove 6 of the semi-cylinder crystal holder and the normal direction of the plate-like KBBF crystal is consistent with the normal direction of the square groove. The semi-cylinder crystal holder is connected with the other one which makes the two bulges inserted in to the corresponding grooves arranged on the other semi-cylinder crystal holder to form a columnar crystal holder with stable concentric structure. And then the heating tube 5 is arranged on the outer surface of the crystal holder (FIG. 6b). The temperature of KBBF crystal was maintained at 100° C.

The linear polarized 532 nm laser with average power of 65 W, repetition rate of 10 KHz and pulse width of 10 ns was focused by a focusing len with a focal length of 250 mm. The laser travels along the central axis of the crystal holder 3 through the aperture 4 and incident on the former antireflection film 2 coating on the front surface of KBBF crystal. After the refraction generated on the front surface of the KBBF crystal, the laser can realize the phase matching condition at the inside of the KBBF crystal and generate 266 nm laser emitted from the later antireflection film 21 coating on the back surface of the crystal holder along the central axis direction of the crystal holder 3, and then obtain stabile 266 nm laser output of 12.6 W, and the conversion efficiency is 19.4%.

Embodiment 3

Another Embodiment of the Second Harmonic Generator for Laser for the Present Invention: an External-Cavity with the Fourth Harmonic Generation by RBBF Crystal Firstly, the front and back surface of the plate-like RBBF crystal 1 with 3 mm thickness are polished along its c-axis direction, and then the roughness Ra of the front and back surface is less than 0.5 nm, and the surface accuracy is less than ⅛ aperture.

Furthermore, the front surface of RBBF crystal 1 was coated with the former antireflection film 2 and the back surface of KBBF crystal 1 was coated with the later antireflection film 21. The antireflection films can reduce the reflection light losses for the incident and emitted lasers with the same incident angle of 73.02°. The former antireflection film coated on the front surface of RBBF crystal has high transmittance for 532 nm laser, and the transmittance is greater than 99.9%. The later antireflection film coated on the back film of RBBF crystal has high transmittance for 532 nm and 266 nm lasers, and the transmittance is greater than 99.9%.

As shown in FIG. 2b, the columnar crystal holder 3 of the overall structure has arranged an aperture 4 with through crystal along its central axis. The crystal holder has vertically downward opened a square groove 6 from the top, which is connected to the aperture, the angle 9 between the normal direction of the square groove and the central axis of the crystal holder is 73.02°. The material of the crystal holder is red cooper.

The plate-like RBBF crystal coated with antireflection films was mounted in the square groove 6 of the semi-cylinder crystal holder and the normal direction of the plate-like RBBF crystal is consistent with the normal direction of the square groove. And then the heating tube 5 is arranged on the outer surface of the crystal holder (FIG. 6b. The temperature of RBBF crystal was maintained at 80° C.

The linear polarized 532 nm laser with average power of 40 W, repetition rate of 10 KHz and pulse width of 10 ns was focused by a focusing len with a focal length of 300 mm. The laser travels along the central axis of the crystal holder 3 through the aperture 4 and incident on the former antireflection film 2 coating on the front surface of RBBF crystal. After the refraction generated on the front surface of the RBBF crystal, the laser can realize the phase matching condition at the inside of the RBBF crystal and generate 266 nm laser emitted from the later antireflection film 21 coating on the back surface of the crystal holder along the central axis direction of the crystal holder 3, and then obtain stabile 266 nm laser output of 6.1 W, and the conversion efficiency is 15.3%.

Embodiment 4

The Fourth Embodiment of the Second Harmonic Generator for Laser for the Present Invention: an External-Cavity with the Fourth Harmonic Generation by RBBF Crystal Firstly, the front and back surface of the plate-like RBBF crystal 1 with 3 mm thickness are polished along its c-axis direction, and then the roughness Ra of the front and back surface is less than 0.5 nm, and the surface accuracy is less than ⅛ aperture.

Furthermore, the front surface of RBBF crystal 1 was coated with the former antireflection film 2 and the back surface of KBBF crystal 1 was coated with the later antireflection film 21. The antireflection films can reduce the reflection light losses for the incident and emitted lasers with the same incident angle of 73.02°. The former antireflection film coated on the front surface of RBBF crystal has high transmittance for 532 nm laser, and the transmittance is greater than 99.9%. The later antireflection film coated on the back film of RBBF crystal has high transmittance for 532 nm and 266 nm lasers, and the transmittance is greater than 99.9%.

As shown in FIG. 5, the KBBF crystal holder comprised two nearly triangular prisms with the rectangular coplanar (namely one surface of the nearly triangular prism) along the central axis, and every nearly triangular prism has a through aperture 4 which penetrate the whole crystal holder. The angle θ between the normal direction of the rectangular coplanar and the central axis direction of the crystal holder is 73.02°. The square groove was arranged on the rectangular coplanar of the nearly triangular prism and the square groove was connected to the aperture. Therefore the angle between the normal direction of the square groove and the central axis of the crystal holder is also θ. As shown in FIG. 5, the two nearly triangular prisms have arranged four screw holes which used to fix the two nearly triangular prisms. The material of the crystal holder is red cooper.

The RBBF crystal coated with antireflection films was mounted in the square groove of the nearly triangular prism, the normal direction of the front and back surface of the plate-like RBBF crystal is consistent with the normal direction of the square groove, then the two nearly triangular prisms were fixed by four screw holes screwed by the four bolls. The two nearly triangular prisms with the rectangular coplanar were fixed to form a crystal holder along the central axis. And then the heating tube 5 is arranged on the outer surface of the crystal holder (FIG. 6a). The heating tube was winded by resistance wire which connected with the temperature control device 7 and the temperature of the RBBF crystal was maintained at 65° C. during the process of the experiment.

The linear polarized 532 nm laser with average power of 41 W, repetition rate of 10 KHz and pulse width of 10 ns was focused by a focusing len with a focal length of 300 mm. The laser travels along the central axis of the crystal holder 3 through the aperture 4 and incident on the former antireflection film 2 coating on the front surface of RBBF crystal. After the refraction generated on the front surface of the RBBF crystal, the laser can realize the phase matching condition at the inside of the RBBF crystal and generate 266 nm laser emitted from the later antireflection film 21 coating on the back surface of the crystal holder along the central axis direction of the crystal holder 3, and then obtain stabile 266 nm laser output of 6.4 W, and the conversion efficiency is 15.6%.

What is claimed is:

1. A potassium beryllium fluoroborate (KBBF) family crystal oblique-incidence laser second harmonic generator, comprising
a plate-like KBBF family crystal, having a front polished surface and a rear polished surface that are parallel to each other,
a front antireflection film, coated on the front polished surface of the plate-like KBBF family crystal,
a rear antireflection film, coated on the rear polished surface of the plate-like KBBF family crystal,
a columnar crystal holder, and
a heating tube, arranged to cover an outer surface of the columnar crystal holder;
wherein the columnar crystal holder is provided with an aperture, the aperture passing through the columnar crystal holder along a direction of a central axis of the columnar crystal holder,
wherein the columnar crystal holder is provided with a square groove, the square groove being connected to the aperture, an angle between a normal direction of a large surface of the square groove and the central axis of the columnar crystal holder is $\theta$;
wherein the plate-like KBBF family crystal is positioned inside the square groove of the columnar crystal holder, a normal direction of a front and a back surface of the KBBF family crystal being consistent with a normal direction of the large surface of the square groove;
wherein a fundamental frequency laser travels along the direction of the central axis of the columnar crystal holder and enters the front antireflection film of the front polished surface of the KBBF family crystal;
wherein the fundamental frequency laser meets a phase matching condition inside the KBBF family crystal, and a second harmonic laser emits from the rear antireflection film of the rear polished surface of the KBBF family crystal and travels along the direction of the central axis of the columnar crystal holder;
wherein the KBBF family crystal is the Potassium Beryllium Fluoroborate (KBBF) crystal or a Rubidium Beryllium Fluoroborate (RBBF) crystal; the angle $\theta$ for the KBBF crystal being 62.16°; the angle $\theta$ for the RBBF crystal being 73.02°;
wherein the front antireflection film has a high transmission for a laser of 532 nm; and the rear antireflection film has a high transmission for lasers of 532 nm and 266 nm.

2. The KBBF family crystal oblique-incidence laser second harmonic generator of claim 1, wherein the front polished surface and the rear polished surface of the KBBF family crystal are both crystallography c-planes of the KBBF family crystal in crystallography; a surface roughness Ra is less than 0.5 nm, and a surface accuracy is less than ⅛ aperture.

3. The KBBF family crystal oblique-incidence laser second harmonic generator of claim 1, wherein a shape of the columnar crystal holder is a cylinder, a square prism or a polygonal prism.

4. The KBBF crystal family oblique-incidence laser second harmonic generator of claim 1, wherein the columnar crystal holder includes an upper portion and a lower portion the square groove being divided into along a horizontal direction; or the columnar crystal holder includes a left portion and a right portion, the square groove being equally divided along vertical direction.

5. The KBBF family crystal oblique-incidence laser second harmonic generator of claim 1, wherein material of the columnar crystal holder is red copper or aluminum.

6. The KBBF family crystal oblique-incidence laser second harmonic generator of claim 4, wherein material of the columnar crystal holder is red copper or aluminum.

7. The KBBF family crystal oblique-incidence laser second harmonic generator of claim 1, wherein the heating tube is winded by a resistance wire which is connected to a temperature control device to control a temperature precisely.

8. The KBBF crystal family oblique-incidence laser second harmonic generator of claim 3, wherein the columnar crystal holder includes an upper portion and a lower portion, the square groove being equally divided along a horizontal direction; or the columnar crystal holder includes a left portion and a right portion, the square groove being equally divided along a vertical direction.

9. The KBBF family crystal oblique-incidence laser second harmonic generator of claim 3, wherein material of the columnar crystal holder is red copper or aluminum.

10. The KBBF family crystal oblique-incidence laser second harmonic generator of claim 8, wherein material of the columnar crystal holder is red copper or aluminum.

* * * * *